Feb. 2, 1965 J. L. WOODWORTH 3,168,715

TRIFILAR WOUND HYBRID TRANSFORMER

Filed June 27, 1962

INVENTOR
JOHN LIEUALLEN WOODWORTH

BY J. David Blumenfeld

ATTORNEY

United States Patent Office 3,168,715
Patented Feb. 2, 1965

3,168,715
TRIFILAR WOUND HYBRID TRANSFORMER
John L. Woodworth, Lynchburg, Va., assignor to General Electric Company, a corporation of New York
Filed June 27, 1962, Ser. No. 205,773
3 Claims. (Cl. 333—11)

The present invention relates to a hybrid circuit arrangement, and more particularly, to a hybrid circuit arrangement having three pairs of terminals, each of which has the same characteristic impedance.

Hybrid circuit arrangements are used in various types of transmission apparatus, such as, in power line carrier current applications or in telephone repeater circuits wherein it is desired to use a single amplifier in a transmission line which carries telephone conversations in two different directions. The hybrid circuit is used to prevent the output of the amplifier from being fed back into the input and producing undesired interference and oscillations. Thus such hybrids are generally used to isolate one or more circuits coupled to the same transmission medium to prevent undesirable interaction between the circuits.

Generally, known arrangements of hybrid circuits can be classified in three categories:

(1) those which use an impedance-matching transformer in conjunction with the hybrid transformer to match the characteristic impedance at all terminals, (2) those which have an equal characteristic impedance at all terminals but provide imperfect isolation between transmission circuits thus resulting in overall poor performance, and (3) those which incorporate additional impedance balancing networks to match the characteristic impedance at all terminals.

All of the above mentioned arrangements suffer distinct disadvantages which render them economically and operationally objectionable. The use of an additional transformer for impedance-matching purposes increases the physical size of the hybrid circuit apparatus and increases the cost of manufacture. Any hybrid circuit arrangement in which isolation is imperfect and which does not have a complete rejection of signals between transmission circuits introduces unwanted signals into the circuit and is objectionable for most present day applications. The use of additional impedance balance networks to overcome these problems is also unsatisfactory since it results in undesired power loss across the additional components and also increases the cost of the device.

Accordingly, it is an object of this present invention to provide an improved hybrid circuit arrangement which overcomes the disadvantages of the conventional arrangements described hereinabove.

Another object of the present invention is to provide an improved hybrid circuit arrangement having at least three pairs of terminals, the characteristic impedance between each pair of terminals being equal.

A further object of the present invention is to provide a compact hybrid circuit arrangement using only a single transformer and having at least three pairs of terminals, the characteristic impedance between each pair of the terminals being equal.

With the above objects in mind, the present invention comprises a hybrid circuit arrangement having three pairs of terminals and including a differential transformer having a center-tapped primary and a secondary winding. The center-tap of the primary winding is connected to one terminal of a two-terminal balancing network having a characteristic impedance of Z/2. The other pairs of terminals of the hybrid circuit arrangement are respectively connected to opposite ends of the primary winding and the other terminal of the balancing network. The secondary winding consists of two sections serially connected, the opposite ends of the serially connected secondary winding being connected to one of the pairs of the terminals and being terminated by a characteristic impedance Z. One of the sections of the secondary winding is wound to include a substantially greater number of turns than the other section. By virtue of the two-section secondary, the transformation ratio between the total secondary winding and each section of the primary winding is greater than unity, and such that a matching impedance of Z is thereby determined between each pair of terminals of the hybrid circuit arrangement.

While the specification concludes with claims particularly pointing out and distinctly claiming the subject matter regarding the invention, it is believed that the invention will be better comprehended from the following description taken in connection with the accompanying drawings in which:

Figure 1:
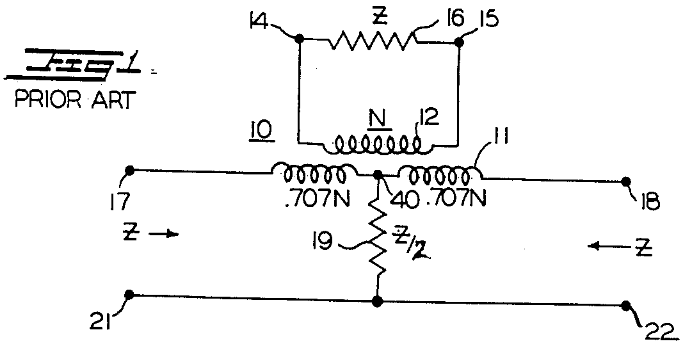
FIG. 1 PRIOR ART
FIG. 1 is a schematic drawing of a prior art hybrid circuit arrangement utilizing the transformation ratio of a hybrid transformer to achieve an equal characteristic impedance at each of three pairs of terminals of the hybrid circuit arrangement.

FIG 1 shows a prior art circuit arrangement, corresponding to the second category mentioned above, having a differential transformer 10 comprised of a center-tapped primary winding 11 and a secondary winding 12. The secondary winding is directly connected to output terminals 14, 15 working into a characteristic impedance 16 having a value of Z. The opposite ends of the center-tapped primary winding 11 are connected to line terminals 17 and 18, while a two-terminal balancing network 19 is connected from center-tap 20 of primary winding 11 to input line terminals 21, 22.

In accordance with well-known procedures, the characteristic impedance of the two-terminal balancing network is based on the theory that the impedance at each of the pairs of terminals should theoretically be balanced so that no transmission nor any impedance transformation is possible from one pair of input terminals to the other. To that end, the secondary winding is wound with N turns, and each section of the center-tapped primary winding is wound with .707N turns.

In accordance with known theory, with the output terminals working into an impedance of Z ohms, the impedance reflected into each section of the center-tapped primary winding 11 must be of a proper magnitude (Z/2) and phase angle, such that the characteristic impedance Z, looking into input terminals 17, 21 and 18, 22, is equal to the impedance Z appearing across output terminals 14, 15.

While the hybrid circuit arrangement of FIG. 1 illustrates a means of theoretically achieving an equal impedance match at each of the terminal pairs, practically, it has been heretofore impossible to achieve an impedance match which gives satisfactory rejection performance between input terminals. This has been theorized to be caused by the fact that windings 11 and 12 have different numbers of turns wound simultaneously on the core. Consequently, the coupling therebetween was always less than unity thereby making it impossible to reflect an impedance of proper magnitude and phase angle into each section of primary winding 11 resulting in a degradation of the rejection between inputs.

Figure 2:
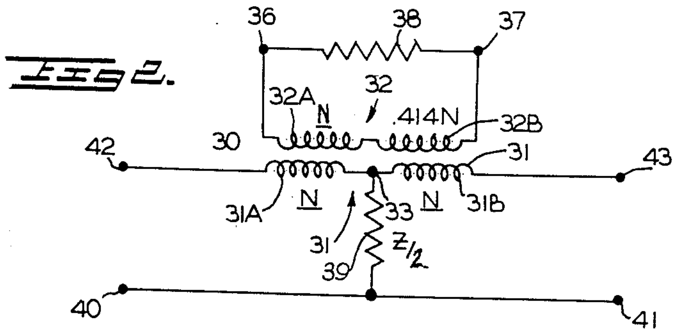
FIG. 2 is a schematic diagram of a hybrid circuit arrangement according to the present invention.

FIG. 2 shows the hybrid circuit arrangement according to the present invention. Differential transformer 30 is comprised of a center-tapped primary winding 31 and a secondary winding 32. The primary winding is center tapped at 33 to provide two sections 31A and 31B, each having N turns, while the secondary winding is comprised of two serially connected sections 32A and 32B. Section 32A is wound to have N turns, and section 32B is wound to have approximately .414N turns. The opposite ends of secondary winding 32 are directly connected to output terminals 36, 37 terminated with a characteristic impedance 38 having a value of Z.

A two-terminal balancing network 39 having a value of $Z/2$ is connected at one end to the center tap 33, the other end being connected to lower input terminals 40, 41. Upper input terminals 42, 43 are connected respectively to the left and right hand ends of primary winding sections 31A, 31B.

In operation, it is desirable to have all three pairs of terminals match the same impedance. To this end, secondary winding section 32A is connected in series with secondary winding section 32B, the ratio of output winding turns being such that secondary winding section 32B comprises approximately 40 percent of the number of turns of secondary winding section 32A. The overall transformation ratio thus established between the total secondary winding 32 and each section 31A, 31B of primary winding 31 is approximately 1.414 to 1.

As hereinbefore described, to provide a desirable "hybrid balance," which is defined as the relation between the voltage input at one pair of hybrid input terminals and any output that this voltage input causes at the other pair of hybrid input terminals, winding sections 31A and 31B of primary winding 31 must be substantially non-inductive with respect to each other to eliminate phase shifts in the transformer action which would prevent the voltages occurring across winding sections 31A and 31B from being in exact 180° out-of-phase relationship. The rejection of the signals between the two inputs and consequently the overall performance of the hybrid circuit is directly dependent on the exact balance between these voltages. In addition, primary winding 31 must be substantially non-inductive with respect to secondary winding 32, otherwise the impedance reflected into each section 31A, 31B of primary winding 31 will not be of the proper magnitude ($Z/2$) and phase angle.

Assuming the characteristic impedance at each pair of terminals is equal to a value of Z and the two-terminal balancing network 39 has an impedance of $Z/2$, the impedance reflected across primary windings 31A and 31B must be equal in magnitude to $Z/2$, and the transformation ratio of the differential transformer is determined in accordance with the general transformer equation:

$$Z_1/Z_2=(N_1/N_2)^2 \quad (1)$$

where $Z_1$ equals the impedance seen at output terminals 36, 37, $Z_2$ equals the impedance reflected across primary winding section 31A (equal to $Z/2$), $N_1$ equals the total number of turns of secondary winding 32 and $N_2$ equals the number of turns of primary winding section 31A, $$(N_1/N_2)^2=Z/Z/2 \quad (2)$$

then $$N_1/N_2=\sqrt{2}=1.414 \quad (3)$$

Assuming that primary winding section 31A is wound with N turns, then the turns of the secondary winding 32 must equal 1.414N. It should be readily apparent that the same solution may be applied to primary winding section 31B.

From Equation 3 above, the number of turns of the serially connected secondary sections 32A, 32B can be readily derived. Since the total turns of the secondary must equal 1.414N, then $$N_1=N_A+N_B=1.414N \quad (4)$$

where $N_A$ and $N_B$ equal respectively the number of turns of each section 32A, 32B of the serially connected secondary 32. If $N_A$ is equal to N number of turns, then $$N_B=1.414N-N \quad (5)$$

$$N_B=N(\sqrt{2}-1) \quad (6)$$

Figure 3:
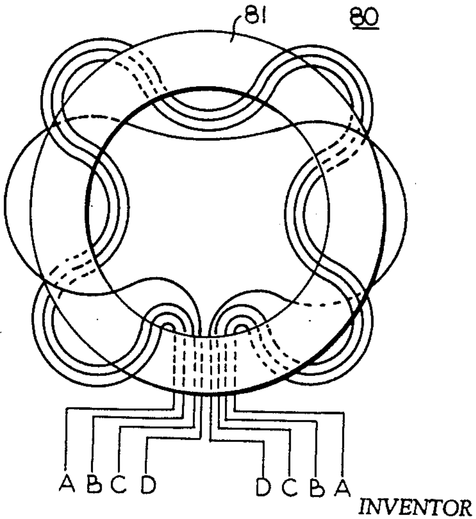
FIG. 3 is a diagram showing the manner of winding the core of the hybrid transformer according to the present invention.

While the above mathematical solution establishes the correct magnitude of the reflected impedance, the correct phasing is accomplished by winding the turns of the windings in such a manner that the entire coupling is as close to unity as possible. Consequently, the voltages across the primary winding sections are substantially equal and opposite in phase and cancel completely. Substantially isolation is thus achieved. Referring to FIG. 3, the manner of winding the differential transformer to establish the non-inductive relationship of the windings is illustrated.

The differential transformer 80 comprises a closed magnetic core 81 shown in toroidal configuration, but which may be square, rectangular or of any other conventional configuration. Windings A, B and C comprise a three-conductor cable or alternately three single conductors bundled together and wound simultaneously on the core to form what is customarily referred to as a trifilar winding. With this construction, windings A, B, and C have substantially unity coupling since the leakage flux is minimized and substantially all of the flux from one winding is cut by the others. The additional winding D, having approximately 40 percent of the turns of winding C is distributed uniformly over the other turns.

Windings A and B are connected together at one end to form the center-tapped primary, each section of the center-tapped primary having the same number of turns. Windings C and D are connected in series to form the secondary winding having a total number of turns equal to 1.414 that of each section of the primary.

It should be readily apparent that the winding D is considerably less effective in introducing phase angle change since more turns are present on winding C than on winding D, the $C+D$ turns will have much less effect with the turns of winding D distributed evenly over the other windings than they would if they were replaced by a single secondary winding conventionally wound over the primary winding, for example, as in the arrangement of FIG. 1.

Figure 4:
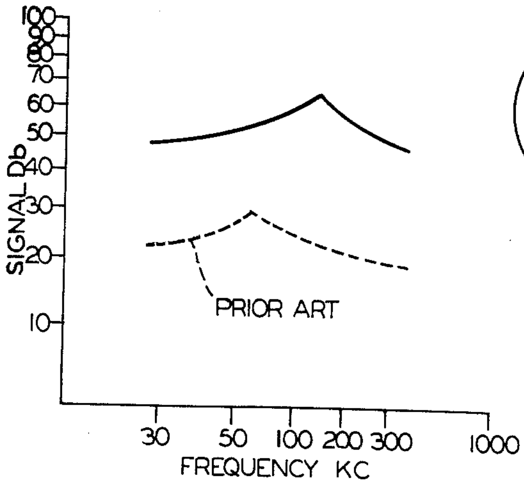
FIG. 4 is a graph comparing the performance of the hybrid circuit arrangement of FIGS. 1 and 2.

FIG. 4 is a graphical representation comparing the performance characteristics of the prior art hybrid circuit arrangement of FIG. 1 and the present invention illustrated in FIG. 2. The "hybrid balance" is plotted versus frequency on the X axis. As shown, the lower curve represents the performance of the prior art hybrid circuit arrangement of FIG. 1, while the upper curve represents the performance of the hybrid circuit arrangement of the present invention. Over a frequency range of 30 kc. to 300 kc., the present invention achieves substantially greater rejection characteristics than heretofore possible in the prior art arrangement.

It is therefore apparent that with the described circuit incorporating the principles of the present invention, a new hybrid circuit arrangement is obtained having three pairs of terminals, the characteristic impedance between each pair of terminals being equal. To this end, an additional number of turns are connected in series in the secondary winding of the differential transformer, the ratio of the additional secondary winding turns to the other secondary winding turns being $$N(\sqrt{2}-1)$$

The performance of the hybrid circuit arrangement is further enhanced by winding the conductors comprising the center-tapped primary and the section of the secondary winding comprising the greater number of turns simultaneously onto the core, and then distributing the other secondary winding section uniformly over all the conductors.

Although a particular embodiment of the subject invention has been described, many modifications may be made, and it is intended by the appended claims to cover all such modifications which fall within the true spirit and scope of the invention.

What is claimed as new and desired to be secured by Letters Patent is:

1. A hybrid circuit arrangement having three pairs of terminals, comprising, in combination, a differential transformer having a center-tapped primary winding providing two primary winding sections and a secondary winding having a first and a second secondary winding section serially connected, each of said primary winding sections and said first secondary winding section having the same number of turns and wound on said core in trifilar relationship whereby the coupling between said winding is maximized, said second secondary winding section being distributed uniformly around said center-tapped primary winding and the first secondary winding section, said secondary winding being terminated at the first of said pairs of terminals by a characteristic impedance of Z, a two-terminal balancing network having one terminal thereof connected to the center-tap of said primary winding and having a characteristic impedance of $Z/2$, the second of said pairs of terminals being connected to one end of said primary winding and to the other terminal of said balancing network, the third of said pairs of terminals being connected to the opposite end of said primary winding and to said other terminal of said balancing network, said differential transformer having a transformation ratio between said secondary winding and each section of said center-tapped primary winding greater than unity and such that an impedance of Z is thereby determined between each pair of terminals of said hybrid circuit arrangement.

2. The hybrid circuit arrangement as set forth in claim 1 wherein said one secondary winding section comprises a substantially greater number of turns than the other secondary winding section, and said transformation ratio between said secondary winding and each primary winding section is approximately 1.414 to 1.

3. The hybrid circuit arrangement as set forth in claim 1 wherein each of said primary winding sections and said first secondary winding comprise N number of turns, said second secondary winding section having approximately $N(\sqrt{2}-1)$ number of turns whereby the transformation ratio between the secondary winding and each primary winding section is approximately 1.414 to 1.

References Cited by the Examiner

UNITED STATES PATENTS

| | | | |
|---|---|---|---|
| 1,781,308 | 11/30 | Vos | 336—170 |
| 2,909,733 | 10/59 | Walter | 333—11 |
| 2,947,952 | 8/60 | Hughes | 333—11 |

OTHER REFERENCES

Thiele: "A Hybrid Network for Mixing and Splitting Signals," Proceedings of the I.R.E., Australia, (pages 383 to 387).

HERMAN KARL SAALBACH, *Primary Examiner.*
ELI LIEBERMAN, *Examiner.*